United States Patent
Bechmann et al.

(10) Patent No.: US 10,828,834 B2
(45) Date of Patent: Nov. 10, 2020

(54) PLANT FOR ADDITIVELY MANUFACTURING OF THREE-DIMENSIONAL OBJECTS

(71) Applicant: Concept Laser GmbH, Lichtenfels (DE)

(72) Inventors: Florian Bechmann, Lichtenfels (DE); Ralf Hetzel, Bad Staffelstein (DE); Jens Stammberger, Rödental (DE); Fabian Zeulner, Lichtenfels (DE); Alexander Hofmann, Weismain (DE)

(73) Assignee: CONCEPT LASER GMBH, Lichtenfels (DE)

( * ) Notice: Subject to any disclaimer, the term of this patent is extended or adjusted under 35 U.S.C. 154(b) by 104 days.

(21) Appl. No.: 15/812,359

(22) Filed: Nov. 14, 2017

(65) Prior Publication Data
US 2018/0133963 A1    May 17, 2018

(30) Foreign Application Priority Data
Nov. 14, 2016    (DE) .......................... 10 2016 121 769

(51) Int. Cl.
  *B29C 64/20*    (2017.01)
  *B29C 64/255*   (2017.01)
  (Continued)

(52) U.S. Cl.
  CPC .......... *B29C 64/255* (2017.08); *B22F 3/1055* (2013.01); *B29C 64/00* (2017.08);
  (Continued)

(58) Field of Classification Search
  CPC ... B29C 64/255; B29C 64/259; B29C 64/307; B29C 64/214; B29C 64/393;
  (Continued)

(56) References Cited

U.S. PATENT DOCUMENTS

| 6,824,714 B1 | 11/2004 | Türck et al. |
| 7,357,629 B2 | 4/2008 | Weiskopf et al. |

(Continued)

FOREIGN PATENT DOCUMENTS

| DE | 102004057866 A1 | 6/2006 |
| DE | 1020132002955 A1 | 2/2013 |

(Continued)

OTHER PUBLICATIONS

European Search Report Corresponding to Application No. 17175024 dated Dec. 22, 2017.
(Continued)

*Primary Examiner* — Joseph S Del Sole
*Assistant Examiner* — Jamel M Nelson
(74) *Attorney, Agent, or Firm* — Dority & Manning, P.A.

(57) ABSTRACT

A system (1) for additive manufacturing of three-dimensional objects, comprising one or more working stations (21), which are provided for performing at least one working process in the additive manufacturing of three-dimensional objects, at least one freely positionable mobile storage unit (2) comprising a rack-like storage device (4) comprising at least one storage room (5) provided for storing at least one powder module (6), especially for the purpose of conveying the powder module (6) between different working stations (21) of the system (1), and at least one driverless, freely movable mobile conveying unit (3) comprising a receiving device (12) provided for receiving at least one mobile storage unit (2) for the purpose of conveying the storage unit (2) between different working stations (21) of the system (1).

20 Claims, 1 Drawing Sheet

(51) Int. Cl.

| | | |
|---|---|---|
| *B29C 64/314* | (2017.01) | |
| *B29C 64/25* | (2017.01) | |
| *B29C 64/153* | (2017.01) | |
| *B22F 3/105* | (2006.01) | |
| *B33Y 30/00* | (2015.01) | |
| *B29C 64/393* | (2017.01) | |
| *B33Y 10/00* | (2015.01) | |
| *B29C 64/259* | (2017.01) | |
| *B29C 64/00* | (2017.01) | |
| *B29C 64/35* | (2017.01) | |
| *B29C 64/343* | (2017.01) | |
| *B29C 64/268* | (2017.01) | |
| *B33Y 50/02* | (2015.01) | |
| *B29C 64/371* | (2017.01) | |
| *B22F 3/00* | (2006.01) | |

(52) U.S. Cl.
CPC ............ *B29C 64/153* (2017.08); *B29C 64/20* (2017.08); *B29C 64/25* (2017.08); *B29C 64/259* (2017.08); *B29C 64/314* (2017.08); *B29C 64/393* (2017.08); *B33Y 10/00* (2014.12); *B33Y 30/00* (2014.12); *B22F 3/004* (2013.01); *B22F 2003/1056* (2013.01); *B22F 2003/1057* (2013.01); *B22F 2999/00* (2013.01); *B29C 64/268* (2017.08); *B29C 64/343* (2017.08); *B29C 64/35* (2017.08); *B29C 64/371* (2017.08); *B33Y 50/02* (2014.12); *Y02P 10/25* (2015.11)

(58) Field of Classification Search
CPC ..... B29C 64/153; B29C 64/25; B29C 64/343; B29C 64/35; B29C 64/268; B29C 64/371; B22F 3/1055; B33Y 10/00; B33Y 30/00; B33Y 50/02
See application file for complete search history.

(56) References Cited

U.S. PATENT DOCUMENTS

| | | | |
|---|---|---|---|
| 7,771,155 B2 | 8/2010 | Twelves, Jr. et al. | |
| 10,357,827 B2 | 7/2019 | Shaw et al. | |
| 10,603,847 B2 | 3/2020 | Herzog | |
| 2004/0002741 A1 | 1/2004 | Weinberg | |
| 2007/0288123 A1* | 12/2007 | D'Andrea | B66F 9/063 700/214 |
| 2013/0064707 A1 | 3/2013 | Matsui et al. | |
| 2016/0332375 A1 | 11/2016 | Juan et al. | |
| 2016/0339640 A1 | 11/2016 | Juan et al. | |
| 2017/0028472 A1 | 2/2017 | Shaw et al. | |
| 2018/0001567 A1 | 1/2018 | Juan et al. | |
| 2018/0050491 A1* | 2/2018 | Ishihara | B33Y 70/00 |
| 2019/0009334 A1* | 1/2019 | Effernelli | B22F 3/1055 |

FOREIGN PATENT DOCUMENTS

| | | | |
|---|---|---|---|
| DE | 102012002955 A1 | 8/2013 | |
| DE | 102014007408 A1 | 11/2015 | |
| DE | 102014016718 A1 | 5/2016 | |
| DE | 112014006189 T5 | 9/2016 | |
| EP | 1704989 A2 * | 9/2006 | ........... B29C 64/153 |
| EP | 1704989 A2 | 9/2006 | |
| EP | 1961514 A2 | 8/2008 | |
| JP | 2003/507224 A | 2/2003 | |
| JP | 2003/231182 A | 8/2003 | |
| JP | 2006/289973 A | 10/2006 | |
| JP | 2007/084275 A | 4/2007 | |
| JP | 2007084275 A * | 4/2007 | |
| JP | 2013/056466 A | 3/2013 | |
| JP | 2017/031505 A | 2/2017 | |
| JP | 2017/512689 A | 5/2017 | |
| WO | WO2015/108551 A1 | 7/2015 | |
| WO | WO2016/116139 A1 | 7/2016 | |
| WO | 2017109395 A1 | 6/2017 | |

OTHER PUBLICATIONS

Machine Translated Japanese Search Report Corresponding to Application No. 2017171232 dated Oct. 26, 2018.
Machine Translated Japanese Office Action Corresponding to Application No. 2017171232 dated Oct. 31, 2018.
European Search Report Corresponding to Application No. 18200653 dated Feb. 28, 2019.
European Search Report Corresponding to Application No. 18200654 dated Feb. 28, 2019.

* cited by examiner

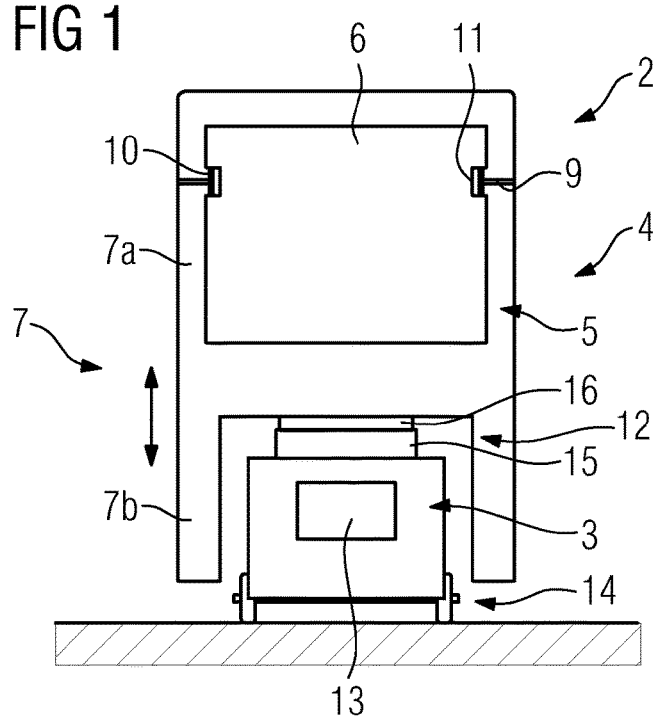
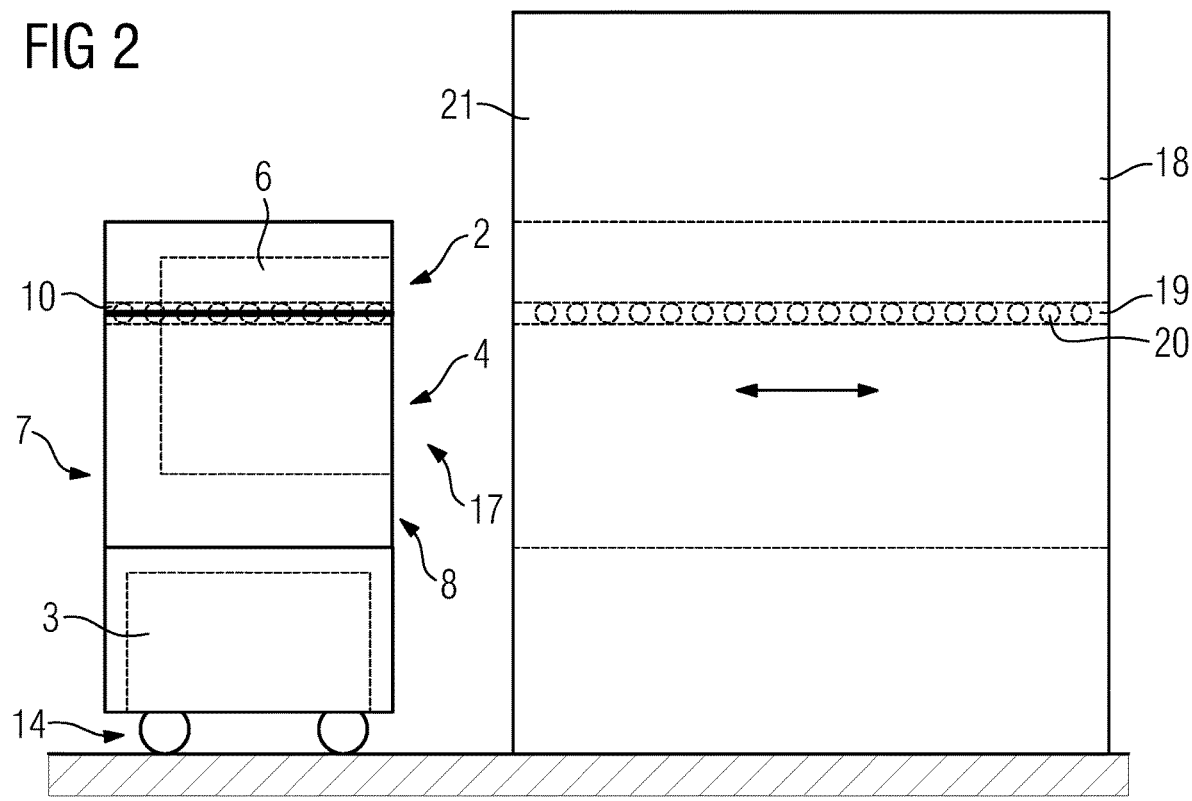

PLANT FOR ADDITIVELY MANUFACTURING OF THREE-DIMENSIONAL OBJECTS

CROSS-REFERENCE TO RELATED APPLICATIONS

This application claims priority to German Patent Application serial no. 10 2016 121 769.7 filed Nov. 14, 2016, the contents of which is incorporated herein by reference in its entirety as if set forth verbatim.

The invention relates to a system for additive manufacturing of three-dimensional objects, comprising one or more working stations, which are each provided for performing at least one working process in the additive manufacturing of three-dimensional objects.

Systems for additive manufacturing of three-dimensional objects are basically known. Respective systems typically comprise several working stations, each of which is provided for performing at least one working process in the additive manufacturing of three-dimensional objects.

Occasionally, it may be necessary to convey or to intermediately store powder modules, such as construction modules, limiting a construction room, in which the actual additive construction of three-dimensional objects is carried out, between different working stations of a system. An automatable or automated possibility of conveyance and intermediate storage of powder modules is desired in particular.

The invention is based on the object of providing, especially in terms of the possibility of conveyance and intermediate storage of powder modules, an improved apparatus for additive manufacturing of three-dimensional objects.

The object is solved by a system according to claim 1. The dependent claims relate to possible embodiments of the system.

The system herein described ("system") serves the additive manufacturing of three-dimensional objects, i.e., for example, technical components or technical component groups. The system comprises several working stations, each provided for performing at least one working process in the additive manufacturing of three-dimensional objects ("objects"). Respective working processes in the additive manufacturing of an object on the one hand relate to additive working processes, i.e. additive construction processes, in which an additive construction of an object is actually carried out, especially by successive, selective layer-by-layer exposure and thus successive, selective layer-by-layer solidification of construction material layers of a construction material that can be solidified by means of an energy beam, and preparatory working processes to be performed or performed prior to an additive working or construction process, i.e., for example, cleaning, inerting or temperature control processes of powder modules, and post-processing working processes to be performed or performed after an additive working or construction process, i.e., for example, unpacking processes of objects additively manufactured from respective powder modules.

A first working station provided for performing additive working processes, also referred to as process station, can thus comprise an apparatus ("apparatus") for additive manufacturing of objects. The apparatus is provided for additive manufacturing of objects, i.e., for example, technical components or technical component groups, by successive, selective layer-by-layer exposure and thus successive, selective layer-by-layer solidification of construction material layers of a construction material that can be solidified. The construction material can be a particulate or powdered metal material, plastic material, and/or ceramic material. The selective solidification of respective construction material layers to be selectively solidified is carried out based on object-related construction data. Respective construction data describe the geometric structural design of the respective object to be additively manufactured and can, for example, include "sliced" CAD data of the object to be additively manufactured. The apparatus can be formed as an SLM apparatus, i.e. as an apparatus for performing selective laser melting methods (SLM methods), or as an SLS apparatus, i.e. as an apparatus for performing selective laser sintering methods (SLS methods).

The apparatus comprises the functional components typically required for performing additive construction processes. This especially involves a coating device provided for forming construction material layers (in the construction plane of the apparatus) to be selectively solidified, and an exposure device provided for the selective exposure of construction material layers (in the construction plane of the apparatus) to be selectively solidified. The coating device typically comprises several components, i.e., for example, a coating element comprising an, especially blade-shaped, coating tool, and a guiding device for guiding the coating element along a defined trajectory. The exposure device typically also comprises several components, i.e., for example, a beam generation device for generating an energy or laser beam, a beam deflection device (scanner device) for deflecting an energy or laser beam generated by the beam generation device to a section to be exposed of a construction material layer to be selectively solidified and to various optical elements, such as lens elements, objective elements, etc. The functional components of the apparatus mentioned are typically arranged or formed on or in a, typically inertable, process chamber of the apparatus.

An optional other (or second) working station provided for performing post-processing working processes, also referred to as post-processing station, can comprise an apparatus for unpacking an object additively manufactured. The apparatus can be provided for unpacking an object additively manufactured by removing the, typically non-solidified, construction material surrounding the object additively manufactured. The apparatus here comprises the functional components required for removing the, typically non-solidified, construction material surrounding the object additively manufactured. This especially involves a suction and/or blower device provided for generating a suction and/or blower flow by means of which the construction material to be removed can be suctioned or blown off.

An optional other (or third) working station provided for performing preparatory working processes, also referred to as preparatory station, can comprise an apparatus for cleaning and/or inerting and/or temperature controlling powder modules. The apparatus can be provided for cleaning and/or inerting and/or temperature controlling powder modules. The apparatus here comprises the functional components required for cleaning and/or inerting and/or temperature controlling of powder modules. This especially involves a cleaning device, which is e.g. provided for generating a cleaning flow cleaning a powder chamber of the powder module, or an inerting device, which is provided for generating an inert gas flow inerting a powder chamber of the powder module, or a temperature control device, which is provided for temperature controlling a powder module to a certain target temperature.

Independent of their specific functional designs, respective working stations typically comprise their own housing construction, on or in which the functional components of the respective working stations are arranged or formed. The working stations are thus to be seen as separate functional units of the system, spatially-physically defined by respective housing constructions, which can be positioned in various configurations relative to each other, e.g. in one or more housing (portions), especially factory buildings.

The system typically comprises a plurality of powder modules used in the additive manufacturing of three-dimensional objects. A respective powder module is provided for receiving and/or dispensing construction material and, for this purpose, typically comprises a powder chamber. The powder chamber limits a powder room that can be filled with construction material. The powder room is limited at least on the side by walls (powder chamber walls) of the powder chamber generally formed like a hollow parallelepiped or a hollow cylinder. At the bottom, the powder room is limited by a carrying device. The carrying device is typically movably supported between two end positions, i.e. between an upper end position (relative to the height of the powder module) and a lower end position, relative to the powder chamber. The movable support of the carrying device enables the realization of an, especially linear, movement of the carrying device along a vertical movement axis or in a vertical movement direction. The movable support of the carrying device is typically realized by an, especially (electric) motor, drive and/or actuator device coupled with the carrying device.

Specifically, the powder module can be a construction module, in which the actual additive construction of objects is performed and which, for this purpose, is filled with construction material to be solidified in a successive, selective layer-by-layer manner when performing additive construction processes, or a metering module, via which, when performing additive construction processes, construction material is metered out into the process chamber, or a collector module or overflow module, respectively, which, when performing additive construction processes, is filled with non-solidified construction material.

The system further comprises at least one, typically more, freely positionable mobile storage unit(s), and at least one, typically more, driverless, freely movable mobile conveying unit(s). As it follows from below, by the interaction of a storage unit and a conveying unit, a modular conveying and storage system enabling concurrent storing and conveying of a powder module can be realized.

A respective storage unit comprises at least one rack-like storage device. The storage device comprises at least one storage room, which is provided for storing at least one powder module, especially for the purpose of conveying the powder module between different working stations of the system. The storage room is typically formed by a frame structure comprising several, especially wall-like, frame structure portions, defining the outer design of the storage unit. The frame structure typically comprises first frame structure portions limiting the storage room, and second frame structure portions, via which the storage unit can be placed on a foundation. Respective first frame structure portions can limit the storage room especially at the bottom, laterally, and at the ceiling. The first frame structure portions also define at least one access opening, via which powder modules can be moved into and out of the storage room. Respective second frame structure portions can be formed stand-like, i.e. especially as stands, such that they enable a stable placing of the storage unit onto a foundation.

A respective conveying unit comprises at least one receiving device. The receiving device is provided for receiving at least one mobile storage unit for the purpose of conveying the storage unit between different working stations of the system. A respective conveying unit typically comprises at least one, especially (electric) motor, drive device supplied with energy via energy storage, i.e., for example, a battery, which is provided for generating a drive force, and a power transmission device coupled with the drive device, which is provided for transmitting the drive force generated by the drive device to a foundation for generating a movement of the conveying unit relative to the foundation. The power transmission device can specifically comprise a number of e.g. wheels, rollers, or chains, via which the transmission of the drive force generated by the drive device to a foundation for generating a movement of the conveying unit relative to the foundation can be realized.

A respective conveying unit can be automatically moved along different, i.e. especially freely configurable, trajectories. The configuration of respective trajectories can be firmly defined in a control direction of a respective conveying unit and can be changed by corresponding control information transmitted to the conveying unit, e.g. via radio. For transmitting, i.e. especially for receiving, respective control information, a conveying unit can be equipped with suitable, especially radio-based, communication interfaces. Respective communication interfaces can especially also enable a communication of conveying units among each other; a respective communication especially includes the, especially bi-directional, exchange of movement and/or position information regarding a current or future movement or positioning of a conveying unit.

On respective first frame structure portions a mounting device can be arranged or formed, which is provided for mounting at least one powder module in the storage room. The mounting device can be provided to movably mount a powder module relative to the frame structure, for what the mounting device comprises storage elements enabling a movable storage of a powder module arranged in the mounting device relative to the frame structure.

Respective storage elements can e.g. be sliding or roller storage elements, which by formation of a movable storage interact with a powder module, i.e., for example, engage into operating portions provided in the powder module e.g. by recesses formed on the powder module.

A first frame structure portion of the frame structure, limiting the bottom of the storage room, can be arranged or formed spaced apart from a foundation such that between the surface of the first frame structure portion facing the foundation and the foundation a clearance is formed. The conveying unit can be dimensioned, especially in terms of its height dimension, such that it can be moved into the clearance below the first frame structure portion limiting the bottom of the storage room. By moving the conveying unit into the clearance, i.e. below the first frame structure portion limiting the bottom of the storage room, a receiving position can be defined, in which the conveying unit can receive the storage unit.

The receiving device can comprise at least one, especially plate-like or plate-shaped, receiving element coupled with the lifting device. The receiving element is movably supported between at least one, i.e. possibly also more, upper position(s), in which the receiving element is provided to abut against a storage unit, especially a first frame structure portion limiting the bottom of the storage room on one side, such that the storage unit can be lifted or is lifted from a foundation, and a lower position, in which the receiving element is not provided to abut against a storage unit, especially a first frame structure portion limiting the bottom of the storage room on one side, such that the storage unit can be lifted or is lifted from a foundation. The lifting device can comprise an, especially (electric) motor, lifting drive, i.e., for example, a lifting spindle drive or lifting cylinder drive, which is provided for generating a lifting power for moving the receiving element into the respective positions.

A respective working station can comprise at least one transfer interface, via which a powder module is transferable, i.e. can be transferred, from the working station to the storage unit or from the storage unit to the working station.

A respective conveying unit can be (automatically) moved into a defined docking position, in which the conveying unit is moved relative to the transfer interface such that a powder module can be transferred from the working station into the storage room of a storage unit received on the conveying unit. A respective conveying unit is in the docking position typically directly moved to the or against the (exposed) outer surface of the housing construction of the respective working station having the transfer interface.

The transfer interface can be closed by a closing device. The closing device can comprise a closing element, which can be movably supported between an open position, in which the transfer interface is released for transferring a powder module from the working station into a storage room of a storage unit or for transferring a powder module from the storage room of a storage unit into the working station, and a closed position, in which the transfer interface is not released for transferring a powder module from the working station into a storage room of a storage unit or for transferring a powder module from the storage room of a storage unit into the working station. Moving the closing element into the open or closed position, or vice versa, can be automatically carried out depending on the detection of movement of a conveying unit into the docking position or depending on the detection of a conveying unit moved into the docking position. The detection of movement of a conveying unit into the docking position or the detection of a conveying unit moved into the docking position can be realized by a suitable detection device. The detection device can e.g. comprise proximity or contact sensor technology, via which movement of a conveying unit into the docking position or a conveying unit moved into the docking position can be detected.

A respective working station can comprise a housing construction with a mounting device. The mounting device can be provided to movably mount a powder module along a transport track extending through the working station relative to the housing construction, for what the mounting device comprises storage elements enabling a movable storage of a powder module arranged in the mounting device relative to the housing construction. Respective storage elements can in turn e.g. be sliding or roller storage elements, which by formation of a movable storage interact with a powder module, i.e., for example, engage into operating portions provided in the powder module e.g. by recesses formed on the powder module. The working station can comprise a drive device interacting with the mounting device, via which a drive force moving a powder module along the transport track can be generated.

Respective mounting devices of the working stations and respective mounting devices of the storage units, especially respective storage units received on a conveying unit, purposefully align with each other such that a continuous transport track extending between storage unit and working station is resulting, making it possible for powder modules mounted in respective mounting devices to be transferred from a working station to a storage unit, and vice versa, without difficulty.

For the same purpose, respective mounting devices of the working stations and respective mounting devices of the storage units are purposefully standardized or formed identically.

The invention is explained in more detail by means of exemplary embodiments in the figures of the drawings. In which:

FIG. 1 is a schematic diagram of a conveying unit and a storage unit of a system for additive manufacturing of three-dimensional objects according to an exemplary embodiment; and FIG. 2 is a schematic diagram of a detail of a system for additive manufacturing of three-dimensional objects according to an exemplary embodiment.

FIG. 1 shows a schematic diagram of a driverless mobile conveying unit 3 and a freely positionable mobile storage unit 2 of a system 1 for additive manufacturing of three-dimensional objects according to an exemplary embodiment.

The storage device 2 comprises a rack-like storage device 4 comprising a storage room 5 provided for storing at least one powder module 6, i.e., for example, a construction module, especially for the purpose of conveying the powder module 6 between different working stations 21 of the system 1. The storage room 5 is typically be formed by a frame structure 7 comprising several, especially wall-like, frame structure portions 7a, 7b, defining the outer design of the storage unit 2. The frame structure 7 typically comprises first frame structure portions 7a limiting the storage room 5, and second frame structure portions 7b, via which the storage unit 2 can be placed on a foundation. The first frame structure portions 7a can limit the storage room 5 especially at the bottom, laterally, and at the ceiling. The first frame structure portions 7a also define at least one access opening 8, via which powder modules 6 can be moved into and out of the storage room 5. Respective second frame structure portions can be formed stand-like, i.e. especially as stands, such that they enable a stable placing of the storage unit 2 onto a foundation.

A first frame structure portion 7a of the frame structure 7, limiting the bottom of the storage room 5, is arranged spaced apart from the foundation such that between the surface of the first frame structure portion 7a facing the foundation and the foundation a clearance is formed.

On the first frame structure portions 7a, i.e. on the inner surfaces of the frame structure portions 7a facing the storage room 5, a mounting device 9 is arranged or formed, which is provided for mounting a powder module 6 in the storage room 5. The mounting device 9 is provided to movably mount the powder module 6 relative to the frame structure 7, for what the mounting device 9 comprises storage elements 10 enabling a movable storage of a powder module 6 arranged in the mounting device 9 relative to the frame structure 7. The storage elements 10 can e.g. be sliding or roller storage elements, which by formation of a movable storage interact with a powder module 6, i.e. engage into operating portions provided in the powder module by recesses 11 formed on the powder module. The operating portions extend at least partially along two wall portions of the powder module 6 arranged opposite each other.

The conveying unit 3 comprises a receiving device 12 provided for receiving a mobile storage unit 2 for the purpose of conveying the storage unit 2 between different working stations 21 of the system 1. The conveying unit 3 comprises an, especially (electric) motor, drive device 13 provided for generating a drive force, and a power transmission device 14 coupled with the drive device 13, which is provided for transmitting the drive force generated by the drive device 13 to a foundation for generating a movement of the conveying unit 3 relative to the foundation. The power transmission device 14 comprises a number of wheels, rollers, or chains, via which a transmission of the drive force to the foundation can be realized.

From the Figure it can be seen that the conveying unit 3 is, especially in terms of its height dimensions, dimensioned such that it can be moved into the clearance below the first frame structure portion 7a limiting the bottom of the storage room 5. By moving the conveying unit 3 into the clearance, i.e. below the first frame structure portion 7a limiting the bottom of the storage room 5, a receiving position shown in the Figure is defined, in which the conveying unit 3 can receive the storage unit 2.

The receiving device 12 comprises an, e.g. plate-like or plate-shaped, receiving element 16 coupled with the lifting device 15. The lifting device 15 comprises an, especially (electric) motor, lifting drive (not shown), i.e., for example, a lifting spindle drive or lifting cylinder drive, which is provided for generating a lifting power for moving the receiving element 16. The receiving element 16 is by means of the lifting device 15 movably supported between at least one, i.e. possibly also more, upper position(s), in which the receiving element 16 is provided to abut against the storage unit 2, i.e. especially against the first frame structure portion 7a limiting the bottom of the storage room 5, such that the storage unit 2 can be lifted or is lifted from the foundation, and a lower position, in which the receiving element 16 is not provided to abut against a storage unit 2, especially against the first frame structure portion 7a limiting the bottom of the storage room 5, such that the storage unit 2 is lifted from the foundation.

The conveying unit 3 can be automatically moved along different, i.e. especially freely configurable, trajectories. The configuration of respective trajectories can be firmly defined in a control device (not shown) of a respective conveying unit 3, and can be changed by corresponding control information transmitted to the conveying unit 3, e.g. via radio. For transmitting, i.e. especially for receiving, respective control information, the conveying unit 3 is equipped with suitable, especially radio-based, communication interfaces (not shown). Respective communication interfaces can also enable a communication of conveying units 3 among each other; a respective communication especially includes the, especially bi-directional, exchange of movement and/or position information regarding a current or future movement or positioning of a conveying unit 3.

FIG. 2 shows a schematic diagram of a detail of a system 1 for additive manufacturing of three-dimensional objects according to an exemplary embodiment.

The system 1 comprises, although in FIG. 2 only one single working station 21 is shown, several working stations 21, i.e., for example, processing stations provided for performing additive working processes, in which an apparatus for additive manufacturing of three-dimensional objects is arranged or formed.

The working station 21 comprises a housing construction 18 with a mounting device 19, which is provided to movably mount a powder module 6 along a transport track extending through the working station 21 (cf. double arrow) relative to the housing construction 18. For that purpose, the mounting device 19 is equipped with storage elements 20 enabling a movable storage of a powder module 6 arranged in the mounting device 19 relative to the housing construction 18. Respective storage elements 20 can in turn e.g. be sliding or roller storage elements, which by formation of a movable storage interact with a powder module 6, i.e. engage into the operating portions provided in the powder module by e.g. recesses 11 formed on the powder module. The working station 21 can comprise a drive device (not shown) interacting with the mounting device 19, via which a drive force moving a powder module 6 along the transport track can be generated.

From FIG. 2 it can be seen that respective mounting devices 19 of the working stations 21 and respective mounting devices 9 of the storage units 2, especially respective storage units 2 received on a conveying unit 3, purposefully align with each other such that a continuous transport track extending between storage unit 2 and working station 21 is resulting, making it possible for powder module 6 mounted in respective mounting devices 9, 19 to be transferred from a working station 21 to a storage unit 2, and vice versa, without difficulty.

The working station 21 comprises at least one transfer interface 17, via which a powder module 6 is transferable, i.e. can be transferred from the working station 21 to the storage unit 2 or—as shown in FIG. 2—a powder module 6 is transferable, i.e. can be transferred from the storage unit 2 to the working station 21.

A respective conveying unit 3 can be (automatically) moved into a defined docking position, in which the conveying unit 3 is moved relative to the transfer interface 17 or the working station 21 such that a powder module 6 can be transferred from the working station 21 into the storage room 5 of the storage unit 2 received on the conveying unit 3, or can vice versa be transferred from the storage room 5 of the storage unit 2 received on the conveying unit 3 into the working station 21. As shown in FIG. 2, a respective conveying unit 3 is in the docking position directly moved to the or against the (exposed) outer surface of the housing construction 18 of the respective working station 21 having the transfer interface 17.

The transfer interface 17 of the working station can be closed by a closing device (not shown). The closing device can comprise a closing element, which can be movably supported between an open position, in which the transfer interface 17 is released for transferring a powder module 6 from the working station 21 into a storage room 5 of a storage unit 2 or for transferring a powder module 6 from the storage room 5 of a storage unit 2 into the working station 21, and a closed position, in which the transfer interface 17 is not released for transferring a powder module 6 from the working station 21 into a storage room 5 of a storage unit 2 or for transferring a powder module 6 from the storage room 5 of a storage unit 2 into the working station 21. Moving the closing element into the open or closed position, or vice versa, can be automatically carried out depending on the detection of movement of a conveying unit 3 into the docking position or depending on the detection of a conveying unit 3 moved into the docking position. The detection of movement of a conveying unit 3 into the docking position or the detection of a conveying unit 3 moved into the docking position can be realized by a suitable detection device (not shown). The detection device can e.g. comprise proximity or contact sensor technology, via which movement of a conveying unit 3 into the docking position or a conveying unit 3 moved into the docking position can be detected.

By the interaction of the storage unit 2 and the conveying unit 3, a modular conveying and storage system enabling concurrent storing and conveying of powder modules 6 can be realized.

The invention claimed is:

1. A system for additive manufacturing of three-dimensional objects, comprising a plurality of working stations provided for performing at least one working process in the additive manufacturing of three-dimensional objects, the system comprising:
at least one mobile storage unit, being freely positionable, comprising a rack-like storage device comprising at least one storage room provided for storing at least one powder module for conveying the at least one powder module between a plurality of working stations of the system, and
at least one mobile conveying unit, being driverless and freely movable, comprising a receiving device provided for receiving the at least one mobile storage unit for the purpose of conveying the at least one mobile storage unit between the plurality of working stations of the system, the receiving device comprising:
a lifting device; and
at least one receiving element coupled with the lifting device, the at least one receiving element movably supported between:
an upper position in which the at least one receiving element is provided to abut against the at least one mobile storage unit; and
a lower position in which the at least one receiving element is provided to be spaced apart from the at least one mobile storage unit.

2. The system according to claim 1, wherein the at least one storage room is formed by a frame structure, the frame structure comprising:
a plurality of frame structure portions defining the outer design of the at least one mobile storage unit;
a plurality of first frame structure portions limiting the at least one storage room; and
a plurality of second frame structure portions, via which the at least one mobile storage unit can be placed on a foundation.

3. The system according to claim 2, wherein a mounting device is arranged or formed on at least one of the plurality of first frame structure portions, the mounting device provided for mounting the at least one powder module in the at least one storage room.

4. The system according to claim 3, wherein the mounting device is provided to movably mount the at least one powder module relative to the frame structure, wherein the mounting device comprises a storage element providing movable storage of the at least one powder module relative to the frame structure.

5. The system according to claim 3, wherein the at least one first frame structure portion limiting the at least one storage room is arranged or formed spaced apart from the foundation such that between the surface of the at least one first frame structure portion facing the foundation and the foundation a clearance is formed, wherein the at least one mobile conveying unit is dimensioned such that it can be moved into the clearance below the at least one first frame structure portion limiting the bottom of the at least one storage room.

6. The system according to claim 1, wherein the receiving element is provided in the upper position to abut against a first frame structure portion limiting the bottom of the at least one storage room on one side and in the lower position to be spaced apart from the first frame structure portion.

7. The system according to claim 1, wherein at least one of the plurality of working stations comprises at least one transfer interface, via which the at least one powder module can be transferred from the at least one working station to the at least one mobile storage unit or the at least one powder module can be transferred from the at least one mobile storage unit to the at least one working station.

8. The system according to claim 7, wherein the at least one mobile conveying unit can be moved into a defined docking position, in which the at least one mobile conveying unit is moved relative to the transfer interface such that the at least one powder module can be transferred from the at least one working station into the at least one storage room of the at least one mobile storage unit received on the at least one mobile conveying unit.

9. The system according to claim 7, wherein the transfer interface can be closed by a closing device, wherein the closing device comprises a closing element, which can be movably supported between an open position, in which the transfer interface is released for transferring the at least one powder module from the at least one working station into the at least one storage room of the at least one mobile storage unit or for transferring the at least one powder module from the at least one storage room of the at least one mobile storage unit into the at least one working station, and a closed position, in which the transfer interface is not released for transferring the at least one powder module from the at least one working station into the at least one storage room of the at least one mobile storage unit or for transferring the at least one powder module from the at least one storage room of the at least one mobile storage unit into the at least one working station.

10. The system according to claim 1, wherein at least one of the plurality of working stations comprises a housing construction with a mounting device provided to movably mount the at least one powder module along a transport track extending through the at least one working station relative to the housing construction, wherein the mounting device comprises a plurality of storage elements enabling a movable storage of the at least one powder module arranged in the mounting device relative to the housing construction.

11. The system according to claim 1, wherein the at least one powder module comprises a powder chamber for receiving and/or dispensing construction material.

12. The system according to claim 1, wherein the at least one powder module comprises a process chamber, a collector module, and/or an overflow module, configured for being filled with non-solidified construction material.

13. The system according to claim 12, wherein the at least one powder module further comprises a construction module within which additive construction of objects is performed.

14. The system according to claim 12, wherein the at least one powder module further comprises one or more walls that define a powder room and a carrying device movably supported within the powder room.

15. The system according to claim 1, wherein each of the plurality of working stations is respectively configured for performing at least one working process, the at least one working process comprising an additive construction working process in which an additive construction of an object is carried out.

16. The system according to claim 15, wherein the at least one working process further comprises a post-processing working process performed or to be performed after the additive construction process.

17. The system according to claim 16, wherein the at least one working process further comprises a preparatory working process performed or to be performed prior to the additive construction process.

18. The system according to claim 16, wherein the post-processing working process is an object unpacking process.

19. The system according to claim 1, wherein the mobile conveying unit further comprises a lifting drive providing for generating a lifting power to the receiving element and/or the lifting element for moving the receiving element into at least one of the upper and lower positions.

20. The system according to claim 1, wherein the at least one mobile conveying unit further comprises:
   a drive device provided for generating a drive force; and
   a power transmission device coupled with the drive device, the power transmission device provided for transmitting the drive force to a foundation for generating a movement of the at least one mobile conveying unit.

* * * * *